US009926139B2

(12) United States Patent
Milo et al.

(10) Patent No.: US 9,926,139 B2
(45) Date of Patent: Mar. 27, 2018

(54) LAUNCHING SYSTEM FOR ROBOTIC SAUSAGE LOADING MACHINE (71) Applicant: F.R. DRAKE COMPANY, Waynesboro, VA (US)

(72) Inventors: Nicholas J. Milo, Vesuvius, VA (US); Keith W. Hopkins, Waynesboro, VA (US); George E. Reed, Waynesboro, VA (US)

(73) Assignee: F.R. Drake Company, Waynesboro, VA (US)

( * ) Notice: Subject to any disclaimer, the term of this patent is extended or adjusted under 35 U.S.C. 154(b) by 0 days.

(21) Appl. No.: 15/255,419

(22) Filed: Sep. 2, 2016

(65) Prior Publication Data
US 2017/0066594 A1 Mar. 9, 2017

Related U.S. Application Data (60) Provisional application No. 62/332,745, filed on May 6, 2016, provisional application No. 62/213,928, filed on Sep. 3, 2015.

(51) Int. Cl.
*B65B 19/34* (2006.01)
*B65G 37/00* (2006.01)
(Continued)

(52) U.S. Cl.
CPC ............. *B65G 15/14* (2013.01); *B65B 19/34* (2013.01); *B65B 35/08* (2013.01); *B65B 35/243* (2013.01);
(Continued)

(58) Field of Classification Search
None
See application file for complete search history.

(56) References Cited

U.S. PATENT DOCUMENTS 3,250,372 A 5/1966 Wagner et al.
3,823,815 A 7/1974 Bretten et al.
(Continued)

FOREIGN PATENT DOCUMENTS

DE 4446437 A1 7/1996
EP 0428820 A1 5/1991
FR 3000950 A1 7/2014

OTHER PUBLICATIONS

ISR of corresponding PCT/US2016/050066.

*Primary Examiner* — Kavel Singh
(74) *Attorney, Agent, or Firm* — Berenato & White, LLC (57) ABSTRACT A system, and associated method, for launching and delivering separated food product in organized groups to a robotized packaging station for the product. The system initiates the delivery via a metered hopper of food product delivering the product to a launch V-belt that aligns the product end to end. A successive singulator belt, positioned adjacent to and receiving product from the launch belt, further organizes the product into a single file alignment. An optional separator belt may follow the singulator belt to create gaps between successive product units. The product is then delivered to a pick belt for product to be provided to the packaging robot. The system product information is from a single (per product delivery line) sensor, enabling intergrated end-to-end control from hopper to robot, and a nearly continuous motion of said pick belt.

18 Claims, 7 Drawing Sheets

(51) Int. Cl.
*B65G 47/26* (2006.01)
*B65G 15/14* (2006.01)
*B65G 11/02* (2006.01)
*B65G 17/06* (2006.01)
*B65G 41/00* (2006.01)
*B65G 43/08* (2006.01)
*B65B 35/08* (2006.01)
*B65B 35/24* (2006.01)
*B65G 47/31* (2006.01)

(52) U.S. Cl.
CPC .......... *B65G 11/023* (2013.01); *B65G 17/063* (2013.01); *B65G 41/001* (2013.01); *B65G 43/08* (2013.01); *B65G 47/31* (2013.01); *B65G 2201/0202* (2013.01); *B65G 2203/0233* (2013.01); *B65G 2811/0626* (2013.01)

(56) References Cited

U.S. PATENT DOCUMENTS

| | | |
|---|---|---|
| 4,633,652 A | 1/1987 | Dagenais et al. |
| 5,092,450 A | 3/1992 | Schommartz et al. |
| 5,575,712 A | 11/1996 | Krewer |
| 6,523,328 B1 * | 2/2003 | De Cardenas ........ B65B 61/205 53/133.1 |
| 6,918,485 B2 * | 7/2005 | Holston .................... B65B 5/08 198/394 |

* cited by examiner

LAUNCHING SYSTEM FOR ROBOTIC SAUSAGE LOADING MACHINE

CROSS-REFERENCE TO RELATED APPLICATIONS AND CLAIM TO PRIORITY

This application claims the benefit of provisional applications No. 62/213,928 filed on Sep. 3, 2015, and of No. 62/332,745 filed on May 6, 2016, which are hereby incorporated herein by reference in their entirety and to which priority is claimed.

FIELD OF THE INVENTION

The present invention generally relates to launching and loading of food products and, more particularly, to a food product handling system for controlled transportation of de-linked tubular food products, such as sausages and hot dogs, from a de-linking machine to a picking device for loading organized products into predetermined packages.

BACKGROUND OF THE INVENTION

Automated food product handling is a well-known industry. This field has been undergoing change as use of robotic and machine vision elements have been incorporated to accomplish or supplement what were food handling tasks previously handled by human line workers. The supplementation of robotics and machine vision elements has been used to varying degrees to improve quality, speed, and yield.

While existing robotic sausage loading machines have proven to be useful for various food product launching and loading applications, improvements that may enhance their performance and ease of use, and reduce cost are possible.

BRIEF SUMMARY OF THE INVENTION

According to the invention, there is provided a food product handling system for loading food product, such as sausages and hot dogs. The food product handling system comprises a launching system that prepares a product for loading and packaging in a loading machine. The launching system comprises a metering hopper, a launcher with a V-shaped conveyor, a singulator with a very narrow V-shaped conveyor, separating flights, a product position sensor, and a pick belt conveyor. The launcher operates to organize a load of food products and deliver it in a manner that is appropriate for separating and reorganizing the products via subsequent manipulation of the singulator and separator. The product position is sensed as it passes to the pick belt. The signal from the sensor enables the system controller to anticipate how to advance the pick belt to receive product and, accordingly, enables the pick belt to move at nearly continuous rate of movement. This nearly continuous movement of the pick belt eases the operation of the robotic loading machine receiving product from the pick belt.

The system for loading food products further comprises a loading machine receiving the products from the launching system. In an exemplary embodiment, the loading machine/ station includes a loading robot for staging the food products into groupings suitable for loading into packaging.

Other aspects of the invention, including apparatus, devices, systems, processes, and the like which constitute part of the invention, will become more apparent upon reading the following detailed description of the exemplary embodiments.

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiment(s) is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims means "at least one".

Figure 1:
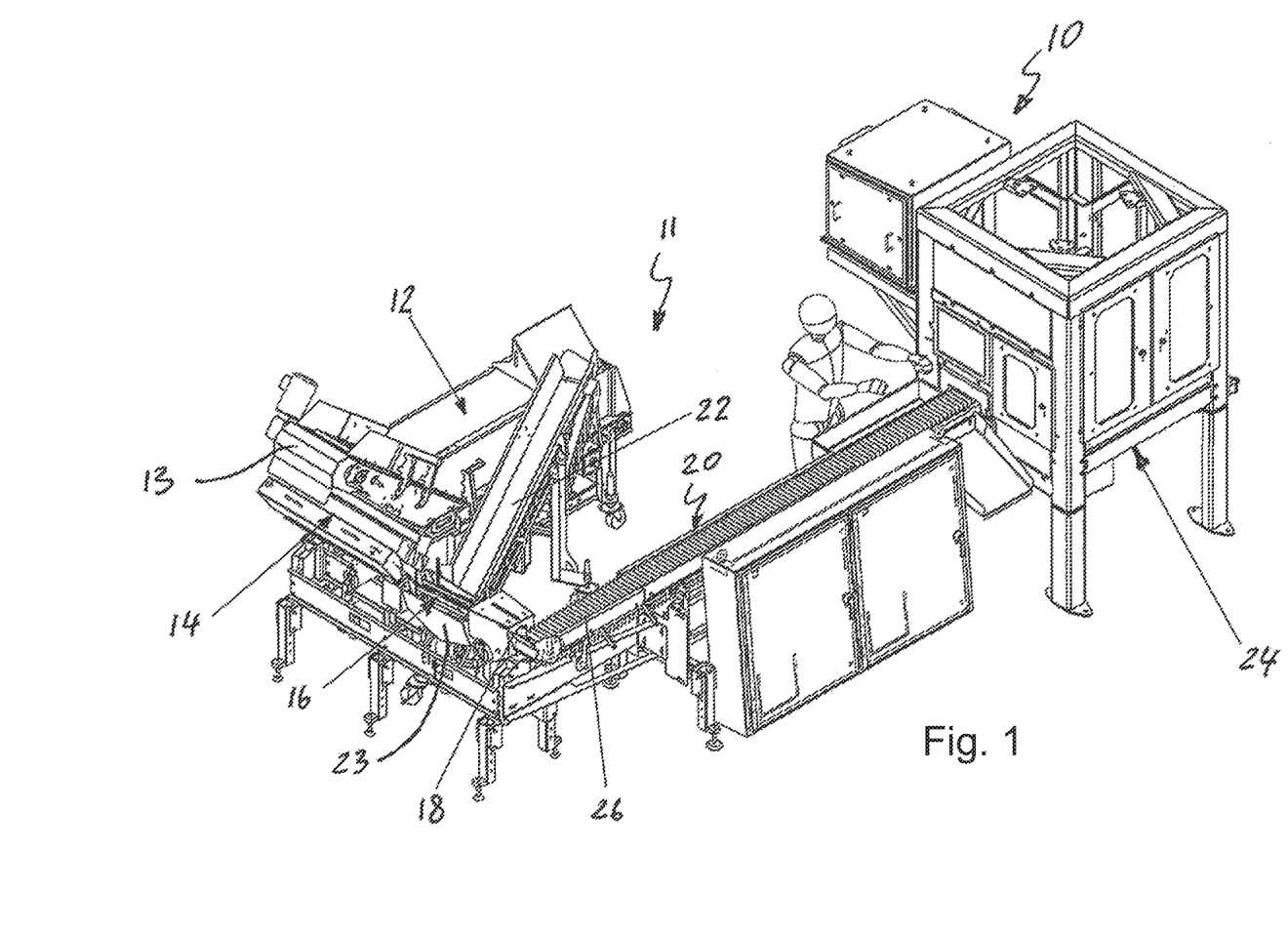
FIG. 1 is a perspective view of a combination launching and loading machine in accordance with a first exemplary embodiment of the present invention.

FIG. 1 of the accompanying drawings illustrates a food product handling system 10 according to a first exemplary embodiment of the present invention. The food product handling system 10 is configured for handling de-linked (separated) tubular food products 2, such as sausages or frankfurters, and is configured as a combination of a launching system 11 and a loading machine 24. The launching system 11 comprises a metering hopper 12 configured to receive a plurality of the de-linked tubular food products 2, a launcher 14, a singulator 16, a product sensor 18 configured to detect the de-linked tubular food products 2, a pick belt conveyor 20, and an excess conveyor 22 to recirculate excess tubular food products tumbling from the singulator 16 back to the metering hopper 12 when the food products 2 do not adequately fit onto the singulator 16. The entire food product handling system 10 is controlled through one or more control panels and one or more conventional programmable logic controllers (PLCs), such as an Allen Bradley Logix 1756-L71.

The metering hopper 12 supplies the launcher 14 with the de-linked tubular food products 2 using an elevated supply conveyor 13 equipped with an incline angle adjustment. In the first exemplary embodiment, the metering hopper 12 is positioned above the launcher 14. The launcher 14 is configured to transport the randomly and loosely oriented tubular food products 2 to the singulator 16. The singulator is known in the art as a mechanism for orienting tubular food products 2 in a single-file line with little or no overlap. An exemplary singulator is the ARB singulator available from Nercon Engineering & Mfg., Inc. The singulator separates the tubular food products, such as sausages, and loads them onto the pick belt conveyor 20.

As is known, many industrial activities require a fixed number of articles that are generally fed randomly and are loosely ordered to be automatically sorted and oriented in a single-file line so that they can thereafter be handled more easily in an automatic or semi-automatic way. The machines carrying out this operation are known as "singulators". In other words, the singulator 16 is particularly intended for the singulation of loose tubular food products, such as de-linked sausages, arranged loosely in a plane, i.e. orienting the de-linked tubular food products in a single-file line, with the products 2 not overlapping or partially overlapping each other.

Figure 2:
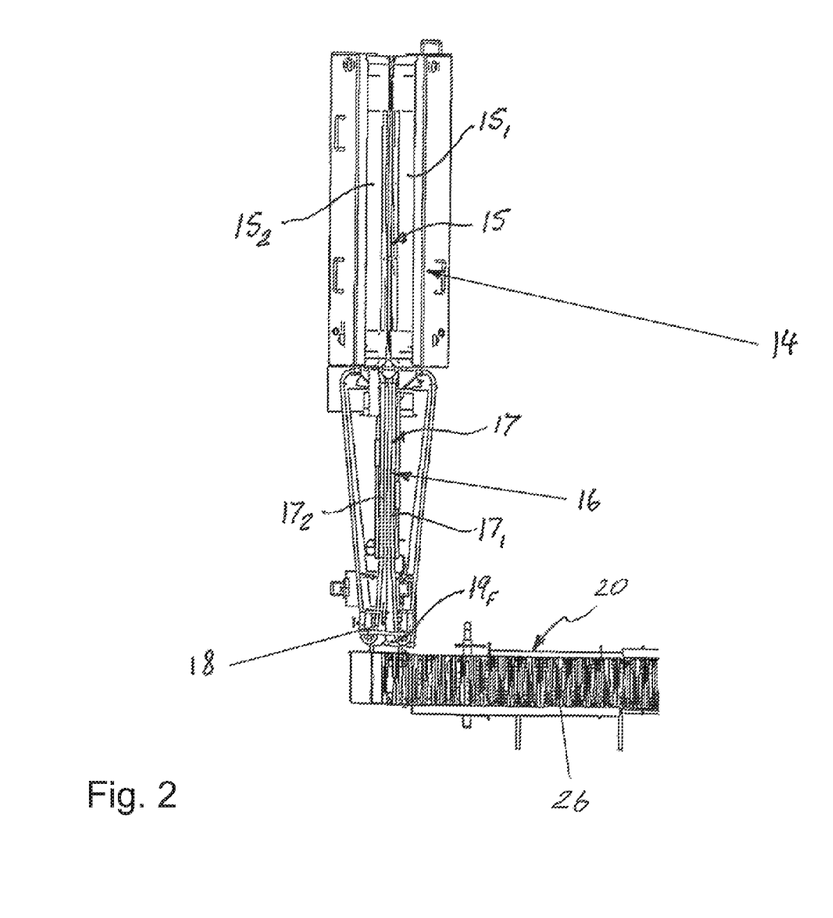
FIG. 2 is a plan view of a launcher system in accordance with the first exemplary embodiment of the present invention.

FIG. 2 also depicts the launcher 14 and the singulator 16. In the first exemplary embodiment of the present invention, the tubular food products 2 are frankfurters. However, the present invention is not limited to a particular type of food product, and may include irregular length, curved and caliber products.

The launcher 14 comprises a V-shaped conveyor belt system 15. The tubular food products 2 drop at a set rate onto the V-shaped conveyor belt system 15 of the launcher 14. The V-shaped conveyor belt system 15 corrals the food products 2 in an aligned manner at the bottom of trough defined between two parallel V configured conveyor belts $15_1$ and $15_2$. The V-shaped launcher 14 is configured to align the tubular food products 2 before transferring them to the singulator 16. The singulator 16 comprises a V-shaped conveyor belt system 17. In turn, the V-shaped conveyor belt system 17 includes a pair of conveyor belts $17_1$ and $17_2$ oriented relative to one another in a V-shaped configuration so as to form a narrow V-shaped configuration between the conveyor belts $17_1$ and $17_2$ that only allows one unit of the tubular food products 2 to move through the conveyor belt system 17 at a time. In other words, a transverse distance between the conveyor belts $17_1$ and $17_2$ of the singulator 16 is substantially smaller than a transverse distance between the conveyor belts $15_1$ and $15_2$ of the launcher 14. The surplus food products 2 fall or tumble into a chute 23 and then to the excess conveyor 22 and are returned to the hopper 12. The singulator 16 may include an additional conveyor, a separator, after the narrow V-portion with a faster surface speed, about twice the speed of the singulator, to create a gap between successive food product units.

The singulator 16 orients the tubular food products 2 in the single-file line, and advances and discharges the tubular food products 2 one-by-one to the pick belt conveyor 20. The pick belt conveyor 20 includes a continuous conveyor feed belt 26 provided with closely located carrier walls 28 oriented transversely to the transport direction 21. The carrier walls 28 divide the conveyor feed belt 26 into transverse compartments (or buckets) 30 configured to contain only one food product 2 at a time. Each of the carrier walls 28 is configured to contain only one of the food products 2, which has dropped down to one of the transverse compartments 30 of the conveyor feed belt 26 from a feed-end $19_F$ of the singulator 16, in the transport direction 21 for delivery of the food products 2 to the loading station 24.

The product sensor 18 at the feed-end $19_F$ of the singulator 16 signals the continuous conveyor feed belt 26 of the pick belt conveyor 20 to advance (or index) the next available empty compartments 30 on the conveyor feed belt 26 to the position in front of the feed-end $19_F$ of the singulator 16. By virtue of sensing the product before it arrives into a pick belt food compartment, the system controller can "anticipate" the arrival of food product, and cause the pick belt to be incremented to a position to receive a product. By sensing between product intervals and product delivery rates, the pick belt can mimic nearly continuous movement even though it is simply regularly incrementing. Owing to the nearly continuous movement of the pick belt conveyor 20, the robotic loader 24 is more easily and reliably controlled.

Figure 3:
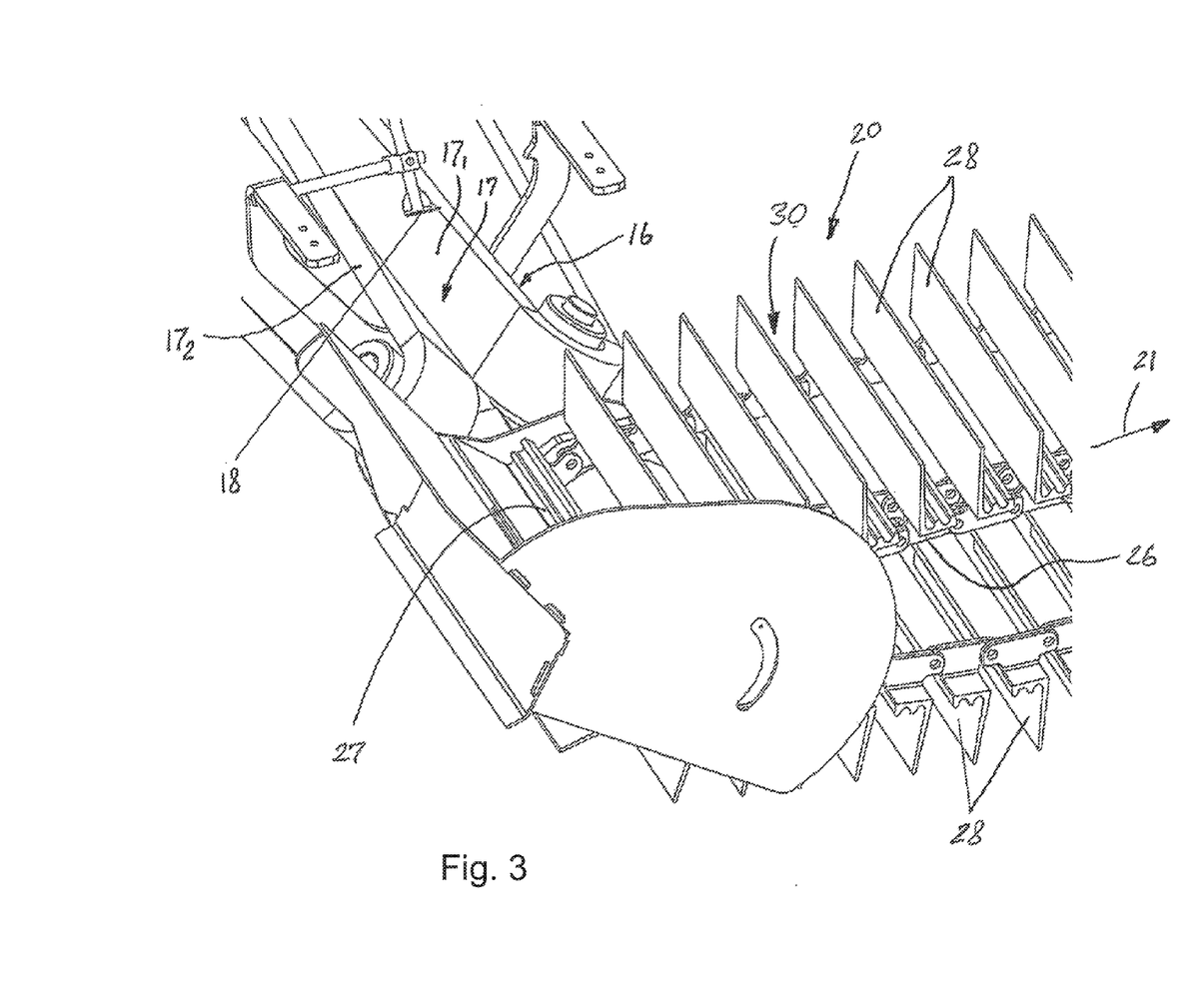
FIG. 3 is a fragmentary perspective view of a pick belt loading mechanism in accordance with the first exemplary embodiment of the present invention.

FIG. 3 shows the first exemplary embodiment of the area where the conveyor feed belt 26 is loaded. The tubular food products 2 are loaded on the location conveyor feed belt 26 as it bends around an end turn 27 of the conveyor feed belt 26. This creates an 'extending' motion between the carrier walls 28, which allows for smoother loading of the tubular food products 2 into the transverse compartments 30 of the conveyor feed belt 26. Each of the tubular food products 2 is loaded into one of the buckets 30 because, as the conveyor feed belt 26 goes around the end turn 27, it "opens" the sidewalls. This allows launching or receiving a curved sausage or the like into the bucket 30 that would not fit if the bucket 30 was in a flat linear position.

The tubular food products 2 are fed to the loading machine 24 by the conveyor feed belt 26 and the tubular food products 2 are staged in the desired grouping, for example by an index lug chain as disclosed in U.S. Pat. No. 8,458,995 incorporated herein by reference. The loading machine 24 comprises a robot (not shown) that picks a group of tubular food products 2 using vacuum and moves it toward one of pockets in a packaging machine (not shown). On the way to the pocket, a picking tool actuates and groups the food products 2 into, for example, two groups of four tubular food products 2. Once grouped, the robot places the grouped food products 2 into corresponding pockets in a packaging machine.

The feeding of the robot with the food products 2 that are orderly, evenly spaced, and in a nearly continuous passing movement solves at least two problems. First, it eliminates the need for robot vision. Second, it enables one robot to handle multiple food products at once, thereby eliminating the need for multiple robots to obtain the throughput required.

Figure 4:
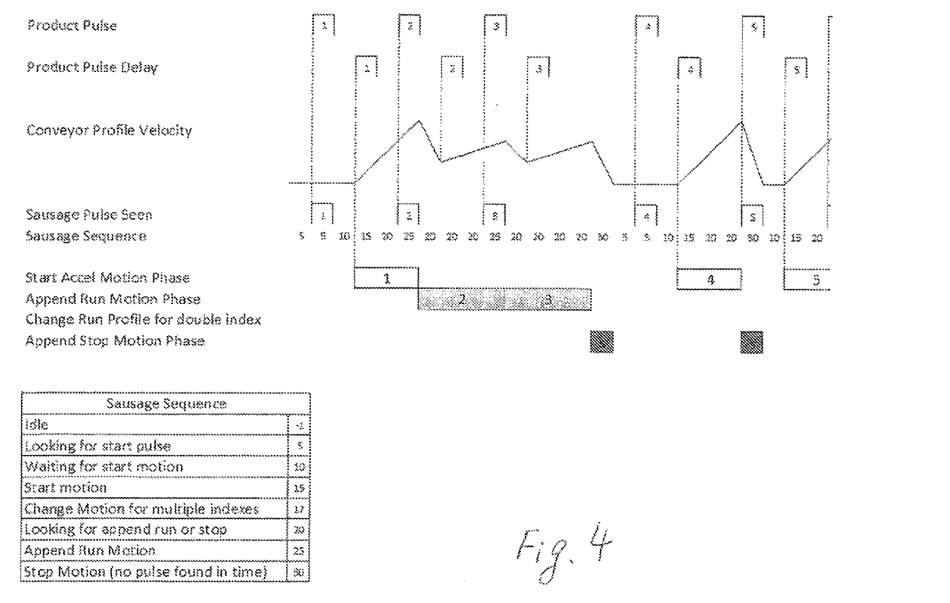
FIG. 4 is a graphical illustration of a method to provide conveyor/singulator/picking synchronization.

A method to provide conveyor/singulator/picking synchronization is as follows:

Simple indexing of the pick belt conveyor 20 for indexed launch feed. Pick timing is windowed to allow least disruption for pick motion.

Use of the product sensor 18 upstream of the singulator 16 to append an appropriate motion on the pick belt conveyor 20 that will yield smoothest motion (i.e., nearly continuous) and/or determine best picking moment from the pick belt conveyor 20.

Graphically the above described method is illustrated in FIG. 4.

Normally, the product sensor 18 pulses on and off for each sausage 2 that passes by. If for some reason there is no gap between the sausages, then the product sensor 18 will appear to have latched on longer than a typical sausage (food product 2) pulse. When this occurs, the controller will detect that the product sensor 18 has been on longer than one sausage passing and will then cause the pick belt conveyor 20 to index more than one flight. This will create the necessary flight for the additional product that passed by the product sensor 18. The number of flights index edge will depend on the length of a sensor pulse. If the length of the sensor pulse exceeds a maximum, the system 10 is configured to stop and handle this condition as a possible jam that can be cleared out automatically or manually. Moreover, the system 10 is setup to index at a typical rate for the sausages that are detected from the product sensor 18. There may be an instance when the sausage rate may surge higher than a typical rate. When this occurs the product sensor 18 will see a pulse from the product sooner than expected. In this case, the response of the system 10 will be similar to that of a latched on condition described above. The pick belt conveyor 20 will be indexed for two flights to account for the extra sausage product detected.

Figure 5:
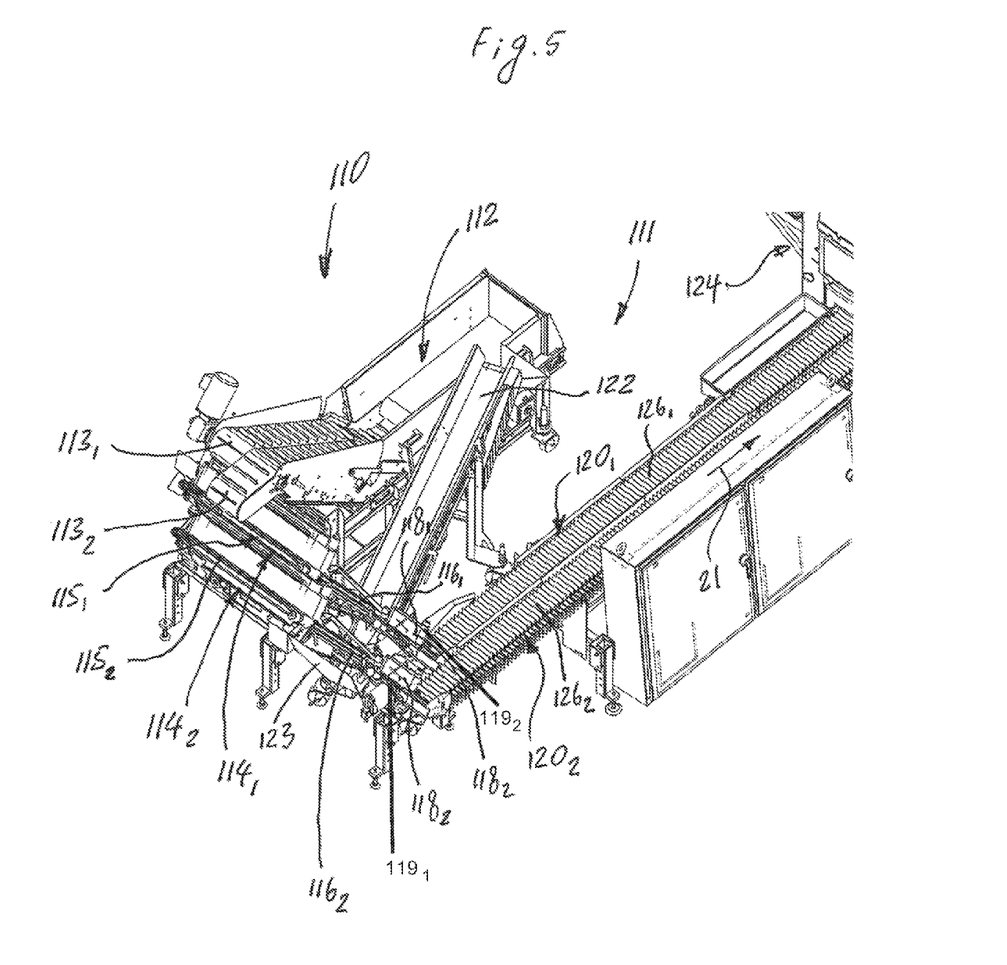
FIG. 5 is a perspective view of a combination launching and loading machine in accordance with a second exemplary embodiment of the present invention, including twin launchers, a pair of respective singulator and separator belts, feeding a pair of pick belts.
Figure 6:
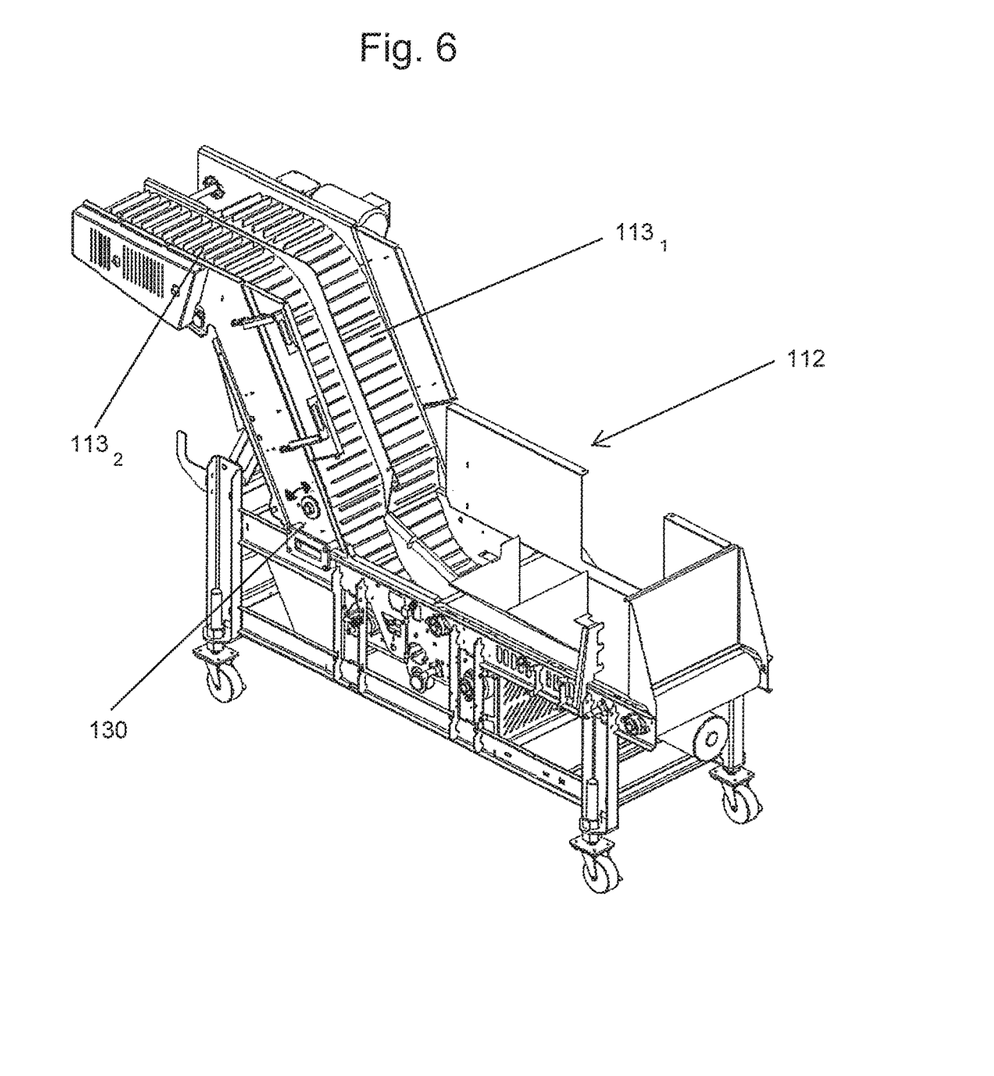
FIG. 6 is a perspective view of a metering hopper with first and second elevated supply conveyors in accordance with the second exemplary embodiment of the present invention at a first steepened limit of adjustment.
Figure 7:
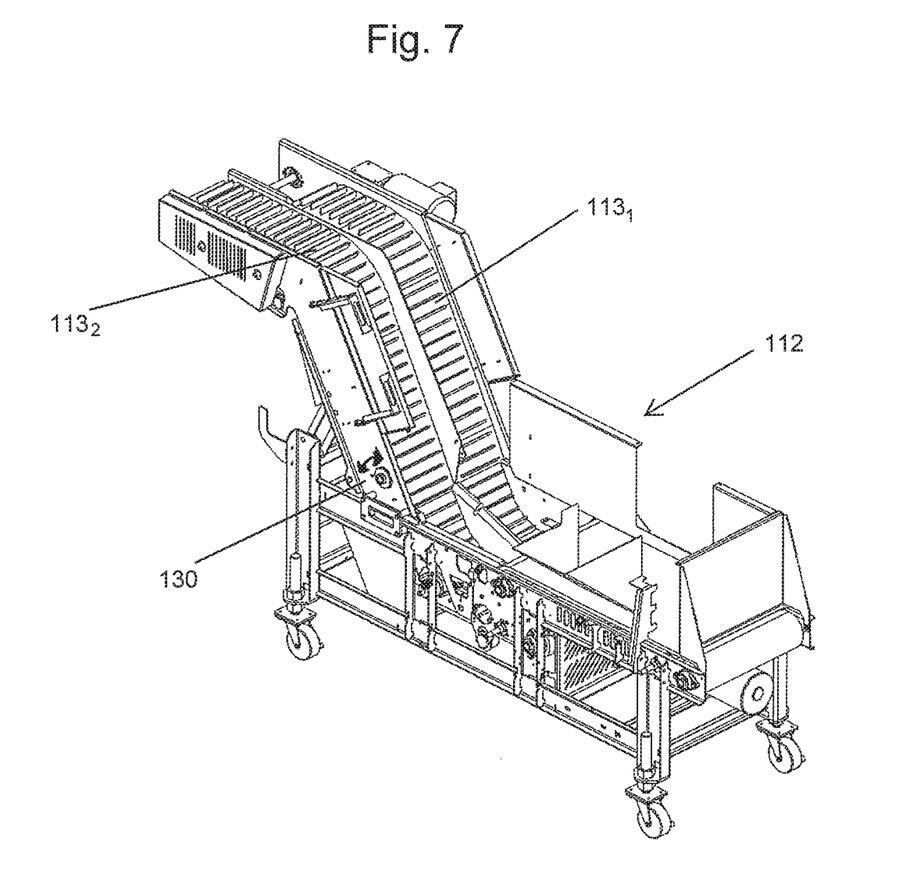
FIG. 7 is a perspective view of the metering hopper with the first and second elevated supply conveyors in accordance with the second exemplary embodiment of the present invention at a second less inclined limit of adjustment.

Various modifications, changes, and alterations may be practiced with the above-described embodiment, including but not limited to the additional embodiment shown in FIGS. 5-7. In the interest of brevity, reference characters in FIGS. 5-7 that are discussed above in connection with Figs. FIGS. 1-3 are not further elaborated upon below, except to the extent necessary or useful to explain the additional embodiments of FIGS. 5-7. Modified components and parts are indicated by the addition of a hundred digits to the reference numerals of the components or parts.

FIG. 5 of the accompanying drawings illustrates a food product handling system 110 according to a second exemplary embodiment of the present invention. The food product handling system 110 is configured for handling de-linked tubular food products 2, such as sausages or frankfurters, and is configured as a combination of a launching system 111 and a loading machine 124. The launching system 111 comprises a metering hopper 112 configured to receive a plurality of the de-linked tubular food products 2. The hopper provides organized aligned product to first and second launchers 114$_1$ and 114$_2$, respectively. The launchers 114, in turn, feed aligned product to first and second singulators 116$_1$ and 116$_2$, respectively. Product sensors 118$_1$ and 118$_2$, in this embodiment, are positioned above separator belts 119$_1$ and 119$_2$, operating at approximately twice singulator belt speed, which feed separated product to first and second pick belt conveyors 120$_1$ and 120$_2$. An excess conveyor 122 recirculates extra tubular food products falling from the first and second singulators 116$_1$ and 116$_2$ back to the metering hopper 112 when the food products 2 do not adequately fit on the singulators 116$_1$ and 116$_2$. The entire food product handling system 110 is controlled through one or more control panels and one or more conventional programmable logic controllers (PLCs), such as an Allen Bradley Logix 1756-L71 according to the previously described method. The distinction for this application is the addition of the separator belts as the source of product position information in the system as supplied by product sensors 118.

The metering hopper 112 supplies the first launcher 114$_1$ with the de-linked tubular food products 2 using a first elevated supply conveyor 113$_1$ having an adjustable incline angle, and the second launcher 114$_2$ using a second elevated supply conveyor 113$_2$ also having an adjustable incline angle. In the second exemplary embodiment, the metering hopper 112 is positioned below the first and second launchers 114$_1$ and 114$_2$. The first and second launchers 114$_1$ and 114$_2$ are configured to transport the randomly and loosely oriented tubular food products 2 to the first and second singulators 116$_1$ and 116$_2$, respectively. The singulator is known in the art as a mechanism for orienting tubular food products 2 in a single-file line with little or no overlap. The first and second singulators 116$_1$ and 116$_2$ "singulate" the tubular food products, i.e., deliver one-at-a-time, and deliver them onto the separator belts which each deliver spaced apart product to first and second pick belt conveyors 120$_1$ and 120$_2$, respectively.

The metering hopper 112 with the first and second elevated supply conveyors 113$_1$ and 113$_2$, respectively, in accordance with the second exemplary embodiment of the present invention at opposite limits of an adjustment are shown in FIGS. 6 and 7. The incline of the respective belts 113 is controlled by adjustment controller 130. The controller 130 is positioned at one end of a rotating shaft suspended side-to-side beneath belts 113. The shaft is equipped with cam or eccentric lobe elements which urge against the underside of the lower portion of the belts 113 and alter each belt, respectively, into steeper or less steep incline(s) dependent on the operator's "tuning" of the incline to a particular food product shape/size/texture. The goal of the incline adjustment is such that successive single aligned products, as often as possible, are retrieved by belts 113 and delivered to the launcher.

Each of the first and second launchers 114$_1$ and 114$_2$ is similar to the launcher 14 and comprises first V-shaped conveyor belt systems 115$_1$ and 115$_2$, respectively, as best shown in FIG. 5. The tubular food products 2 drop by the first elevated supply conveyor 113$_1$ at a set rate onto the first V-shaped conveyor belt system 115$_1$ of the first launcher 114$_1$, and by the second elevated supply conveyor 113$_2$ at a set rate onto the second V-shaped conveyor belt system 115$_2$ of the second launcher 114$_2$. Each of the first and second V-shaped conveyor belt systems 115$_1$ and 115$_2$ corral the food products 2 in an aligned manner at a bottom of trough defined between two parallel V configured conveyor belts. Each of the first and second V-shaped launchers 114$_1$ and 114$_2$ is configured to align the tubular food products 2 before transferring them to the first and second singulators 116$_1$ and 116$_2$, respectively. Each of the first and second singulators $116_1$ and $116_2$ is similar to the singulator 16 and comprises a V-shaped conveyor belt system. In turn, the V-shaped conveyor belt system includes a pair of conveyor belts oriented relative to one another in a V-shaped configuration so as to form a narrow V-shaped configuration between the conveyor belts that only allows one unit of the tubular food products 2 to move through the conveyor belt system at a time. The surplus food products 2 fall onto a chute 123 and then to the excess conveyor 122 and are returned to the hopper 112.

Each of the first and second singulators $116_1$ and $116_2$ orients the tubular food products 2 in the single-file line, and advances and discharges the tubular food products 2 one-by-one to the first and second separator 119, and pick belt conveyors $120_1$ and $120_2$, respectively, as illustrated in FIG. 5. Each of the first and second pick belt conveyors $120_1$ and $120_2$ is similar to the pick belt conveyor 20. As further illustrated in FIG. 5, the first pick belt conveyor $120_1$ includes a first continuous conveyor feed belt $126_1$ provided with closely located carrier walls oriented transversely to the transport direction 21. Similarly, the second pick belt conveyor $120_2$ includes a second continuous conveyor feed belt $126_2$ provided with closely located carrier walls oriented transversely to the transport direction 21. The carrier walls divide each of the first and second conveyor feed belts $126_1$ and $126_2$ into transverse compartments (or buckets) configured to contain only one food product 2 at a time. Each of the transverse compartments is provided to contain only one of the food products 2, which has dropped down to one of the transverse compartments 30 of each of the first and second conveyor feed belts $126_1$ and $126_2$ from a feed-end of the first and second singulators $116_1$ and $116_2$ and collaborating separator belts 119, respectively, in the transport direction 21 for delivery of the food products 2 to the loading station 124.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A food product handling device for de-linked tubular food products, the handling device comprising:
   a metering hopper configured to receive and deliver de-linked tubular food products;
   a singulator configured to orient the de-linked tubular food products into a single-file line;
   a launcher configured to supply the de-linked tubular food products from the metering hopper to the singulator;
   an excess conveyor configured to recirculate un-oriented de-linked tubular food products from the singulator to the metering hopper;
   a pick belt conveyor configured to receive the de-linked tubular food products in the single-file line from the singulator into respective product compartments positioned along the pick belt conveyor, and further configured to transport the de-linked tubular food products to a loading machine; and,
   a product sensor positioned to sense product units of the de-linked tubular food products before the product units are delivered to the pick belt conveyor, the product sensor being configured to deliver a signal to a controller for the pick belt conveyor, thereby allowing indexing of the pick belt conveyor product compartments to anticipate the arrival of product units from said singulator and receive the product units into respective product compartments as the product units are delivered, the product sensor further being configured to deliver the signal to the controller to operate the pick belt conveyor in nearly continuous motion.

2. A device as in claim 1, further comprising:
   a separator belt positioned between the singulator and the pick belt conveyor, the product sensor being located to sense the product units on the separator belt.

3. A device as in claim 1, further comprising:
   a variable incline supply conveyor located within the metering hopper.

4. A device as in claim 3, wherein:
   the pick belt conveyor product compartments are configured to be in an extended condition for receiving the de-linked tubular food products respectively delivered thereto, the extended condition being created by an end turn of the pick belt conveyor.

5. A method of handling a plurality of de-linked tubular food products, comprising the steps of:
   receiving de-linked tubular food products in a metering hopper;
   supplying the de-linked tubular food products from the metering hopper to a singulator;
   operating the singulator to orient the de-linked tubular food products in a single-file line;
   recirculating, via an excess conveyor, excess un-oriented tubular food products from the singulator to the metering hopper;
   placing the de-linked tubular food products from the singulator on to a pick belt conveyor having single product compartments one product unit of the de-linked tubular food products at a time;
   sensing a position of the product unit using a sensor located near a feed end of the singulator, and supplying a signal representing the product unit to a system controller; and, thereafter,
   indexing the pick belt conveyor product compartments in accord with the signal to receive the product unit from the singulator, and transporting the de-linked tubular food products in accord with the signal in a nearly continuous motion by the pick belt conveyor to a loading machine.

6. A device as in claim 2, further comprising:
   a variable incline supply conveyor located within the metering hopper.

7. A device as in claim 1, wherein the product sensor is positioned at a feed end of the singulator.

8. A device as in claim 1, wherein the pick belt conveyor comprises carrier walls oriented transversely to a transport direction of the pick belt conveyor, the carrier walls dividing the pick belt conveyor into the product compartments.

9. A device as in claim 1, further comprising an elevated supply conveyor configured to supply the plurality of the de-linked tubular food products from the metering hopper to the launcher.

10. A food product handling device for de-linked tubular food products, the handling device comprising:
a metering hopper configured to receive and deliver de-linked tubular food products;
a first singulator configured to orient a first plurality of the de-linked tubular food products in a first single-file line;
a second singulator configured to orient a second plurality of the de-linked tubular food products in a second single line;
a first launcher configured to supply the first plurality of the de-linked tubular food products from the metering hopper to the first singulator;
a second launcher configured to supply the second plurality of the de-linked tubular food products from the metering hopper to the second singulator;
a first pick belt conveyor configured to receive the first plurality of the de-linked tubular food products from the first singulator into respective first product compartments positioned along the first pick belt conveyor, one of the de-linked tubular food products per compartment, and transport the first plurality of the de-linked tubular food products to a loading machine;
a second pick belt conveyor configured to receive the second plurality of the de-linked tubular food products from the second singulator into respective second product compartments positioned along the second pick belt conveyor, one of the de-linked tubular food products per compartment, and transport the second plurality of the de-linked tubular food products to the loading machine;
a first product sensor positioned to sense first product units of the first plurality of the de-linked tubular food products before the first product units are delivered to the first pick belt conveyor, the first product sensor being configured to deliver a first signal to a controller for the first pick belt conveyor, thereby allowing appropriate indexing of the first pick belt conveyor to receive the first product units into respective first compartments of the first product compartments as the first product unit is delivered; and
a second product sensor positioned to sense second product units of the second plurality of the de-linked tubular food products before the second product units are delivered to the second pick belt conveyor, the second product sensor being configured to deliver a second signal to a controller for the second pick belt conveyor, thereby allowing appropriate indexing of the second pick belt conveyor to receive the second product units into respective second compartments of the second product compartments as the second product units are delivered.

11. A device as in claim 10, further comprising:
a first separator belt positioned between the first singulator and the first pick belt conveyor, the first product sensor being located to sense the first product unit on the first separator belt; and
a second separator belt positioned between the second singulator and the second pick belt conveyor, the second product sensor being located to sense the second product unit on the second separator belt.

12. A device as in claim 10, further comprising:
first and second variable incline supply conveyors located within the metering hopper.

13. A device as in claim 10, wherein:
the first pick belt product compartments are configured to be in a first extended condition for receiving the first product units delivered thereto; and
the second pick belt product compartments are configured to be in a second extended condition for receiving the second product units delivered thereto.

14. A device as in claim 10, wherein the first product sensor and the second product sensor are positioned at respective feed ends of the first singulator and the second singulator, respectively.

15. A device as in claim 10, further comprising an excess conveyor configured to recirculate de-linked tubular food products from the first and second singulators to the metering hopper.

16. A device as in claim 10, wherein the first and second product sensors further being configured to deliver the signals to the controllers to operate the first and second pick belt conveyor in nearly continuous motion.

17. A device as in claim 10, wherein:
the first pick belt conveyor comprises first carrier walls oriented transversely to a first transport direction of the first pick belt conveyor, the first carrier walls dividing the first pick belt conveyor into the first product compartments; and
the second pick belt conveyor comprises second carrier walls oriented transversely to a second transport direction of the second pick belt conveyor, the second carrier walls dividing the second pick belt conveyor into the second product compartments.

18. A device as in claim 10, further comprising:
a first elevated supply conveyor configured to supply the first plurality of the de-linked tubular food products from the metering hopper to the first launcher; and
a second elevated supply conveyor configured to supply the second plurality of the de-lined tubular food products from the metering hopper to the second launcher.

* * * * *